United States Patent

[11] 3,544,719

[72] Inventor Heinz Kahlbrock
Edison, New Jersey

[21] Appl. No. 737,165
[22] Filed June 14, 1968
[45] Patented Dec. 1, 1970

[73] Assignee Bell Telephone Laboratories, Incorporated
Murray Hill, New Jersey
a corporation of New York

[54] DIRECTIONAL CONTROL CIRCUIT FOR HUB TYPE DATA REPEATER
8 Claims, 1 Drawing Fig.

[52] U.S. Cl. .......... 178/73
[51] Int. Cl. .......... H04l 25/24, H04l 25/60
[50] Field of Search .......... 178/70, 70(TRS), 70(F), 73

[56] References Cited

UNITED STATES PATENTS

| | | | |
|---|---|---|---|
| 2,558,197 | 6/1951 | Rea .......... | 178/73 |
| 3,038,035 | 6/1962 | Davey .......... | 178/73 |

*Primary Examiner*—Kathleen H. Claffy
*Assistant Examiner*—William A. Helvestine
*Attorneys*—R. J. Guenther and Kenneth B. Hamlin

ABSTRACT: Hub repeater directional control circuits normally function to block the application of signals from the hub to any line circuit which is sending into the hub. The control circuit then restores when the incoming signals terminate. The present circuit does not start to restore until the hub ceases to apply signals to the sending leg of the line circuit, thereby accounting for the inherent delay of the hub repeater. Also featured is a double space detector which, when two or more line circuits concurrently send to the hub, operates to override the directional control circuit.

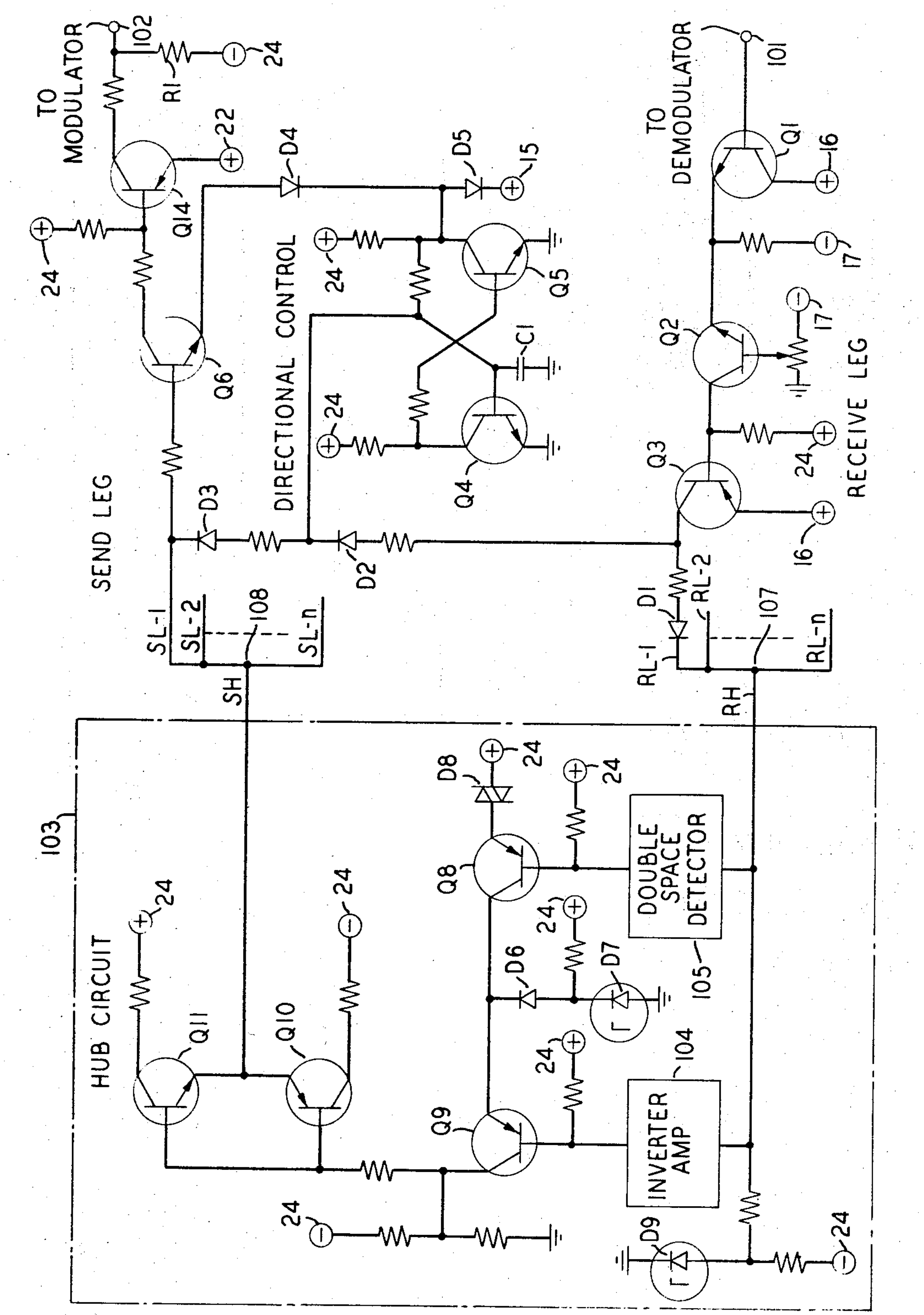
INVENTOR
H. KAHLBROCK
BY R C Lipton
ATTORNEY

DIRECTIONAL CONTROL CIRCUIT FOR HUB TYPE DATA REPEATER

FIELD OF THE INVENTION

This invention relates to hub type repeaters of data signals, and, more particularly, to hub repeater control circuits which preclude looping of signals back to subscribers who are sending into the hub repeater.

DESCRIPTION OF THE PRIOR ART

An arrangement for permitting any one of a group of data subscribers to transmit to all others in the group is called a hub concentration. This arrangement provides for accepting marking and spacing data signals from each subscriber and applying the signals to a common receiving hub or terminal by way of a receiving leg individual to the subscriber and for sending marking and spacing data signals to each subscriber from a common sending hub by way of a sending leg individual to the subscriber. By interconnecting the receiving hub and the sending hub, by way of a regenerative repeater for example, the incoming marking and spacing data signals on the receiving hub are repeated to the sending hub and thus simultaneously transmitted to all subscribers through their respective sending legs.

When the subscriber channels are arranged for half-duplex operation (signaling in one direction at a time), provision must be made in the hub concentration to preclude retransmission back to the sending subscriber. In accordance therewith, a control circuit is provided for each subscriber to block the sending leg when data signals are received from the subscriber by the associated receiving leg. Conventionally, the control circuit is arranged to recognize that signals are being received when the normal idle marking condition is interrupted by spacing signals. Thus, the control circuit operates to block the sending leg when a spacing signal is accepted by the receiving leg. It is a requirement, of course, that the sending leg remains blocked until the spacing signal is repeated by the hub circuit. Since the regenerative repeater in the hub circuit has an inherent delay which may comprise half a signaling (mark or space) element, the control circuit must maintain the sending leg blocked for an interval of several milliseconds or more, depending upon the signaling speed, after the incoming signal element terminates. It is a further requirement that other subscribers be permitted to interrupt the sending subscriber to indicate their desire to send. In prior arrangements, another subscriber interrupts by sending a spacing "break" signal into the hub. The control circuit recognizes that two subscribers are simultaneously sending and unblocks to permit the "break" signal to be sent to the sending subscriber to advise him that another subscriber wishes to transmit.

The utilization of solid state devices in hub concentrations has resulted in the dropping of hub voltages from hundreds of volts to several volts. Control circuits in "high voltage" hubs are normally bistable, operating to the blocking state in response to the incoming space signal and remaining in this state until restored to its initial state after the subscriber stops sending and another subscriber starts sending into the hub. Since the control circuit does not restore after each space signal, it inherently maintains the sending leg blocked for the delay interval of the regenerative repeater.

Providing a similarly arranged "high voltage" hub control circuit, which restores when another subscriber sends into the hub, is not feasible for "low voltage" hubs. The control circuit would not be readily able to compare the small voltage swings on the receiving hub with the incoming signal voltage applied to the receiving leg. In addition, coupling the control circuit to the receiving hub would modify the current flowing into the hub and, since the low voltage hub is necessarily "current sensitive," , complicate the problem of detecting whether a marking signal, a spacing signal or a double spacing signal (two simultaneous spacing signals) is being applied to the hub. Accordingly, control circuits of low voltage hubs, while connected to the receiving leg, are preferably not coupled to the receiving hub. They, therefore, operate when a spacing signal is received and restore when the spacing signal terminates. They include, however, no inherent delay. Thus, to compensate for the delay of the repeater, a capacitive delay circuit is incorporated in the control circuit. Since the delay is milliseconds in length and varies with signaling speed, the capacitive value of the delay circuit must be correspondingly large and variable.

Accordingly, it is an object of this invention to provide a low voltage hub control circuit which compensates for the inherent delay of the repeater without the incorporation of a delay circuit to provide the compensating delay.

In low voltage hub circuits, double space detectors must be able to discriminate between the application of spacing current to the receiving hub by one subscriber receiving leg and the simultaneous application of spacing current by two receiving legs. The low voltage hub double space detector is therefore relatively complex and expensive and it is, therefore, advantageous to employ one common detector. The prior common detectors, however, required circuitry individual to each control circuit to perform the unblocking function.

It is, therefore, another object of this invention to provide a low voltage hub concentration which does not require the control circuit to unblock the associated sending leg to pass a "break" signal therethrough to the sending subscriber.

SUMMARY OF THE INVENTION

The present invention eliminates the requirement of a delay circuit in the control circuit by restoring the control circuit when the regenerated data signals derived from the repeater terminate. More specifically, the control circuit is operated to the blocking state when the subscriber applies an incoming spacing signal to the receiving leg and is restored when the repeater applies a regenerated marking signal to the sending hub. Advantageously, the control circuit comprises a bistable multivibrator which is driven to the blocking state by the operating signal developed by the incoming spacing element and is restored by an opposing signal developed by the regenerated marking signal. The operating signal predominates, however, to maintain the control circuit in the blocking state when the incoming signal is spacing even though the repeater is generating a marking signal.

It is another feature of this invention that the sending leg can pass the double space detector signal without unblocking the control circuit, the "double space" signal indicating to the subscriber that another subscriber is attempting to break in. Since the control circuit does not unblock in response to the "double space," the additional individual circuitry is not required. Advantageously, the control circuit, when operated, applies a blocking bias to the sending leg, precluding passage of signals therethrough, whereas the double space detector applies a signal to the sending leg whose magnitude exceeds the blocking bias and therefore overrides the control circuit block.

The foregoing and other objects and features of this invention will be more fully understood from the following description of an illustrative embodiment thereof taken in conjunction with the accompanying drawing.

BRIEF DESCRIPTION OF THE DRAWING

In the accompanying drawing, the details of a common hub circuit, a receiving leg and the associated sending leg and control circuit are shown in schematic form and arranged in a hub concentration in accordance with this invention.

DETAILED DESCRIPTION

Referring now to the drawing, a signaling hub is shown therein including a receiving hub identified as terminal 107, a sending hub shown as terminal 108, and a hub circuit generally identified as block 103. The receiving hub is connected to the input of hub circuit 103 by way of lead RH and the output of hub circuit 103 is connected in turn to the sending hub by way of lead SH. Hub voltage is provided to receiving hub terminal 107 by hub circuit 103 as described hereinafter.

Receiving hub 107 is multipled to a plurality of receive legs by way of leads RL-1 through RL-n. Similarly, sending hub 108 is multipled to a plurality of send legs via leads SL-1 through SL-n. In accordance therewith, *n* subscriber channels are connected to the hub circuit by way of an individual one of receive leg leads RL-1 through RL-n and similarly connected to sending hub 108 through a corresponding one of send leg leads SL-1 through SL-n.

The receive leg and the send leg of each subscriber is arranged substantially identical to the corresponding legs of other subscribers. Considering a typical subscriber, data signals incoming from the channel are received on an incoming terminal, such as terminal 101. These signals can be derived, for example, from a voice channel, demodulated by a channel terminal and applied as d.c. mark and space signals to terminal 101. Similarly, outgoing mark and space signals from the send leg are applied to the subscriber channel by way of a corresponding outgoing terminal, such as terminal 102. These d.c. signals on terminal 102 may be supplied to a modulator for application to the subscriber voice channel.

In general, the receive leg includes transistors Q1, Q2 and Q3. The send leg comprises transistors Q6 and Q14. Associated with each pair of legs is a directional control circuit which generally comprises a multivibrator including transistors Q4 and Q5.

Considering now the operation of the hub, the incoming mark and space signals received on input terminal 101 are passed to the receive leg which, in turn, then passes corresponding signals to receive hub 107 by way of diode D1. Concurrently, the signals are also applied by way of diode D2 to the directional control flip-flop. The signals applied to receive hub 107 are amplified and regenerated by hub circuit 103, as described hereinafter, and then passed through lead SH to send hub 108. Each send leg, with the exception of the send leg of the sending subscriber, accepts the regenerated signals and passes them through to the individual outgoing terminals. As further described hereinafter, hub circuit 103 also detects when two or more subscribers are attempting to apply space signals to the receiving hub at the same time and, in response thereto, applies a "double space" signal to send hub 108.

Returning now to the directional control circuit, when a space signal is passed by the receive leg through diode D2, the flip-flop therein is operated to block the application of signals back through the send leg by applying a blocking potential on transistor Q6. Accordingly, the send leg of the subscriber who is sending into the hub is disabled to preclude the looping back of the signals back to the subscriber channel.

When the subscriber terminates transmitting the space signal, receiving hub 107 returns to a marking condition. Due to the inherent delay of hub circuit 103, sending hub 108 returns to the marking condition after a short interval. This delayed marking condition on sending hub 108 is passed to each send leg and, in addition, by way of diode D3, to the directional control flip-flop circuit of each subscriber.

At the directional control flip-flop of the sending subscriber it is recalled that this flip-flop has been operated due to the incoming space signal. The marking condition on the corresponding sending leg and applied through diode D3 returns the flip-flop to its normal condition. This removes the blocking potential on transistor Q6. The directional control flip-flop is now in the initial condition, to be operated again to the blocking condition in response to a spacing signal from the subscriber.

In the event that with the subscriber transmitting a spacing signal through the receive leg and lead RL-1 another subscriber desires to initiate transmission, he will attempt to break in by sending a long space. Thus two receive legs will be simultaneously applying space signals to receiving hub 107. As described hereinafter, hub circuit 103 is arranged to detect the simultaneous application of space signals to receiving hub 107. Hub circuit 103 thereupon applies a "double space" signal to sending hub 108. This "double space" signal is passed to transistor Q6 in each send leg. Although the transistor Q6 in the send leg of each of the two sending subscribers is blocked by the direction control circuit at this time, the "double space" signal is sufficient in amplitude to override the directional control signal, thereby passing a space signal to each output terminal 102. Each sending subscriber recognizes that signals received by him indicate that another subscriber is attempting to send into the hub and, in accordance with prescribed operational procedures, the subscriber should terminate his transmission.

Considering the details of the circuit, assume now that the subscriber channel connected to input terminal 101 is in the initial idle marking condition. This results in the application of a steady positive potential to the base of transistor Q1. Transistor Q1 is therefore turned ON, applying its positive emitter voltage to the emitter of transistor Q2. The base of transistor Q2 is therefore rendered negative with respect to its emitter. Accordingly, transistor Q2 is turned OFF.

With transistor Q2 turned OFF in the marking condition, a positive potential is applied to the base of transistor Q3. This positive potential exceeds the positive potential applied to the emitter of the transistor. The transistor is therefore turned OFF. Thus, in the marking condition transistor Q3 does not produce emitter-to-collector current. Accordingly, in this condition no current flows through diode D1 and lead RL-1 to receiving hub 107. Concurrently, no current flows through diode D2 to the directional control circuit.

In hub circuit 103 receive hub 107 is connected by way of lead RH to a hub voltage source and to the inputs of inverter-amplifier 104 and double space detector 105. Considering first the hub voltage, breakdown diode D9 provides with the input impedances of inverter-amplifier 104 and double space detector 105 (which impedances are preferably low) a potential to lead RH which is slightly negative to ground. This hub voltage defines the idle marking condition with no incoming current flowing from any one of the receive legs.

With the slightly negative marking signal voltage on lead RH, inverter-amplifier 104 provides a positive potential to its output and thus to the base of transistor Q9. Similarly, double space detector 105 passes a positive potential to its output and thus to the base of transistor Q8. Inverter-amplifier 104 may include a regenerative repeater and is arranged to regenerate the incoming mark and space signals, passing a positive condition to the base of transistor Q9 in response to marking signals and passing a negative condition to the base of transistor Q9 in response to spacing signals applied to receiving hub 107. Regenerative repeaters, of course, have inherent delay.

Double space detector 105 normally passes a positive condition to the base of transistor Q8 except in the event that two or more subscribers are applying spacing signals to their respective receive legs. As described hereinafter, this results in the application of current from the two or more receive legs, and double space detector 105 detects this threshold of current (which exceeds the normal spacing current) and, in response thereto, passes a negative condition to the base of transistor Q8. Arrangements for detecting double space signals are well known in the art. For example, a double space detector is disclosed in the copending U.S. Pat. application of P. Benowitz and H. Kahlbrock, Ser. No. 476,515 which was filed on Aug. 2, 1965 now U.S. Pat. No. 3,443,022.

Returning now to receive hub 107 and assuming that all subscribers are in the marking or idle marking condition, no incoming current is being passed from any receive leg to the receiving hub. Accordingly, inverter-amplifier 104 applies a positive potential to the base of transistor Q9 and the transistor is therefore turned OFF. Similarly, double space detector 105 has turned OFF transistor Q8. Accordingly, a negative potential is applied to the bases of transistors Q10 and Q11.

Transistors Q10 and Q11 are arranged as complementary emitter-follower circuits. The emitters of the transistors, therefore, follow the incoming signals applied to the corresponding bases. Therefore, transistor Q10 applies a negative signal to its emitter in response to a negative incoming signal and transistor Q11 applies a positive signal to its emitter in response to a positive incoming signal. With a marking signal passing through hub circuit 103, a negative signal is applied to the base of transistor Q10 and the consequent negative emitter voltage is passed by way of lead SH to sending hub 108. In accordance with the specific arrangement shown in the drawing, this signal is preferably ten volts negative.

The negative marking signal is then passed to all send legs and in each send leg applied in parallel to the base of transistor Q6 and to the directional control flip-flop by way of diode D3. The negative signal on the base of transistor Q6 maintains the transistor OFF. This passes a positive potential to the base of transistor Q14. As seen in the drawing, the positive potential applied to the base exceeds the positive potential applied to the emitter of transistor Q14. Transistor Q14 is therefore maintained in the OFF condition. Accordingly, a negative potential is applied by way of resistor R1 to output terminal 102. This negative potential is considered the outgoing marking signal.

Returning now to the negative marking potential applied to the send leg, this potential is passed through diode D3 to the base of transistor Q4. The negative bias on the base maintains transistor Q4 turned OFF. With transistor Q4 turned OFF, its collector voltage is positive applying, in turn, a positive potential to the base of transistor Q5. Transistor Q5, therefore, is turned ON, passing ground to its collector. This ground is applied back to the base of transistor Q4, thereby maintaining the flip-flop in a stable condition with transistor Q5 ON and transistor Q4 OFF. This condition is the condition which enables transistor Q6 since the emitter of transistor Q6 is connected to the collector of transistor Q5 by way of diode D4. Accordingly, the emitter of transistor Q6 is coupled to the ground on the collector of transistor Q5 rendering transistor Q6 responsive to incoming signals applied to its base.

Assume now that the subscriber connected to input terminal 101 initiates transmission. When a spacing signal is received the voltage on terminal 101 goes sufficiently negative to turn OFF transistor Q1. This drops the voltage on the emitter of transistor Q2 below the voltage applied to its base. Accordingly, transistor Q2 turns ON, reducing the potential applied to the base of transistor Q3 below the potential applied to its emitter. Transistor Q3 thereupon turns ON and emitter-to-collector current is passed from a positive 16 volt source to the receiving hub by way of diode D1 and is also passed to the directional control circuit by way of diode D2.

Considering first the directional control circuit, the application of current from the positive 16 volt source through diode D2 overcomes the negative 10 volt potential on sending hub 108 applied via diode D3 to raise the potential on the base of transistor Q4 to above ground. This turns ON transistor Q4, applying ground to its collector. Voltage on the base of transistor Q5 is therefore dropped in turn to turn transistor Q5 OFF. In response thereto the voltage on the collector of transistor Q5 rises until clamped to slightly above 15 volts positive by diode D5. This positive potential on the collector of transistor Q5 also maintains transistor Q4 conductive. In this state the directional control circuit disables transistor Q6, removing the ground applied to its emitter and applying instead the positive 15 volts through diodes D4 and D5. It is noted that capacitor C1, connected to the base of transistor Q4, functions to absorb any incoming hits or noise on the subscriber line. Thus, the incoming current through diode D2 must persist for a sufficient interval to overcome the charge developed on capacitor C1. This is of special significance when another subscriber is sending since, as described hereinafter, during the intervals when spacing signals are on the sending hub, diode D3 is not providing bias to transistor Q4 and any momentary current through diode D2 must be absorbed to prevent the flip-flop from turning over. The capacitor is small and uncritical in size, however, since it overcomes only momentary pulses.

Return now to the application of current by the receive leg to receiving hub 107. This current is passed by way of lead RH to hub circuit 103. The current is detected by inverter-amplifier 104 which, in turn, after the inherent delay of the regenerative repeater therein, applies a negative potential to the base of transistor Q9. The spacing current from the receive leg is insufficient, however, to operate double space detector 105. Accordingly, transistor Q9 turns ON but transistor Q8 is maintained OFF. With transistor Q8 turned OFF a positive potential is applied by way of diode D6 to the emitter of transistor Q9. This positive potential is developed by breakdown diode D7 and constitutes several volts positive with respect to ground. Since transistor Q9 is turned ON, a low impedance path is therefore provided to the bases of transistors Q10 and Q11 by way of the collector-to-emitter path of transistor Q9. Accordingly, a potential slightly positive with respect to ground is applied to the base of transistor Q11 and transistor Q11 in turn applies a positive potential through its emitter to lead SH and then to sending hub 108. This potential is in accordance with the arrangement shown in the drawing approximately 10 volts positive and constitutes a spacing signal.

The spacing signal on sending hub 108 is passed to the several send legs. Considering first the send leg of the sending subscriber, this spacing potential is passed to the base of transistor Q6. Diode D3, of course, blocks the application of the positive potential therethrough to the direction control circuit. Accordingly, with a spacing signal on the sending hub no bias potential is passed via diode D3 to the directional control circuit. The flip-flop therein, however, remains in the operated state.

As previously described, the directional control circuit in the operated state has disabled transistor Q6, that is, the directional control circuit has applied a positive potential of approximately 15 volts to the emitter of transistor Q6. The application of the 10 volt spacing signal, therefore, does not turn transistor Q6 ON. Transistor Q6 therefore remains OFF maintaining OFF, in turn, transistor Q14. Accordingly, a negative potential marking signal is passed to output terminal 102. The send leg therefore blinds the terminal to the spacing signal on the sending hub.

At the send legs of the other subscribers, the positive spacing signal is also applied to transistors therein corresponding to transistor Q6 and the negative bias applied via diode D3 is removed. In each of the other send legs, however, the directional control circuit has been in the initial idle or unoperated state. With no bias current being applied through diode D2 or diode D3, the flip-flop remains in this state. Therefore, the collector of transistor Q5 is applying ground to the emitter of transistor Q6. Accordingly, transistor Q6 turns ON passing current by way of its collector to the base of transistor Q14. Transistor Q14 thereupon turns ON applying positive current by way of its emitter-to-collector circuit to output terminal 102.

This positive current designates an outgoing space signal. Thus, all other subscribers have spacing signals applied to their output terminals 102.

Assume now that the spacing signal from the sending subscriber terminates. Input terminal 101 thereupon goes to the positive marking condition. Transistor Q1 turns ON turning OFF transistor Q2 which, in turn, turns OFF transistor Q3. Transistor Q3, therefore, ceases to pass current through diodes D1 and D2. The termination of the passage of current through diode D2 removes positive bias applied to transistor Q4 in the directional control circuit. The flip-flop therein, however, is still maintained in the operated or blocking condition since the positive collector voltage of transistor Q5 is still applied to the base of transistor Q4 and the sending hub is still in the spacing condition and therefore not applying negative bias to transistor Q4.

The termination of the application of spacing current through a diode D1 restores receiving hub 107 to the marking condition. Accordingly hub circuit 103 again passes a negative marking signal to sending hub 108 after the above-disclosed inherent delay. This negative signal is then applied to all send legs and in each send leg is applied in parallel to the base of transistor Q6 and to the direction control circuit by way of diode D3.

In the direction control circuit of the sending subscriber, if an incoming spacing condition should resume, transistor Q4 would be maintained ON by the positive bias current through diode D2 to maintain the directional control circuit in the operated state. Assume, however, that the marking condition persists; thus the application of the negative potential via diode D3 reapplies a negative bias to the base of transistor Q4, turning it OFF. This turns ON transistor Q5 and the consequent ground on the collector is applied to the base of transistor Q4 and to diode D4. Accordingly, the flip-flop is restored to the initial condition and ground is again passed to the emitter of transistor Q6 by way of diode D4. The negative marking potential on the base of transistor Q6 maintains it OFF, however. Thus, when the marking signal passes through the hub circuit and then to the send leg, the directional control circuit of the sending subscriber is turned around to reenable transistor Q6. The circuit is thus restored to its initial marking condition. When the next spacing signal is received from the subscriber the above-described circuit operations are repeated.

In the sending leg of each of the other subscribers the negative marking signal applied to transistor Q6 turns it OFF. This, in turn, turns OFF transistor Q14. Accordingly, a negative marking potential is applied to output terminal 102.

Returning to the negative marking potential applied to diode D3, this reapplies negative bias to transistor Q4 in the directional control circuit. Since the flip-flop is at this time in the initial unoperated condition, no change in the state of the directional control circuit occurs. At this time, therefore, the directional control circuit and the send leg of each subscriber are in their initial marking conditions awaiting the next spacing signal from the sending subscriber.

Assume now that while the sending subscriber is transmitting a spacing signal another subscriber attempts to break in by concurrently sending a spacing signal. In this event current is provided to receiving hub 107 by way of diode D1 of the sending subscriber and by way of a corresponding diode in the receive leg of the subscriber attempting to break into the circuit. This results in the application of current to the receiving hub which exceeds the amount of current normally applied thereto when a single spacing signal is being transmitted. In accordance therewith, double space detector 105 applies a negative condition to the base of transistor Q8. Transistor Q8 thereupon turns ON, passing current through reversely poled diodes D8 and the emitter-to-collector circuit of transistor Q8 to the emitter of transistor Q9. Accordingly, the potential on the emitter of transistor Q9 is raised to almost 24 volts positive.

When inverter-amplifier 104 applies a negative condition to the base of transistor Q9 in response to the spacing current on the receiving hub, transistor Q9 is turned ON, providing a low impedance path from its emitter to the base of transistor Q11. Since the potential on the emitter of transistor Q9 is nearly 24 volts positive, the emitter of transistor Q11 follows this increased voltage, preferably going to approximately 20 volts positive. This condition is passed to sending hub 108 and designates a double space signal, that is, a signal indicating that at least two subscribers are simultaneously sending spacing signals into the hub.

The positive 20 volt double spacing signal is applied to transistor Q6 in each send leg. In the send legs of those subscribers not attempting to transmit, transistor Q6 is turned ON, turning ON, in turn, transistor Q14 to apply a spacing signal to output terminal 102 in the conventional manner. In the send leg of the sending subscriber, it is recalled that transistor Q6 is blocked by the application of positive 15 volts to the emitter by way of diodes D4 and D5. The 20 volt double space signal applied to the base of transistor Q6 exceeds, however, the 15 volts applied to the emitter. Accordingly, the double space signal overrides the blocking potential provided by the directional control circuit and turns ON transistor Q6. This drops the potential on the base of transistor Q14 below the emitter potential. Transistor Q14 accordingly turns ON, passing a spacing signal to output terminal 102. Therefore, the sending subscriber receives a spacing signal indicating that another subscriber is attempting to break in.

Although a specific embodiment of this invention has been shown and described, it will be understood that various modifications may be made without departing from the spirit of this invention and within the scope of the appended claims.

I claim:

1. In a hub type repeater for data signals, a common hub circuit for regenerating data signals applied thereto, said hub circuit having an inherent delay a plurality of receiving lets, each of said receiving legs arranged to accept data signals from an incoming source and to apply the signals to said common hub circuit, a plurality of sending legs, each of said sending legs corresponding to a receiving leg and arranged to accept regenerated data signals from the common hub circuit and to apply the signals to an outgoing circuit, and a control circuit connected to each receiving leg and operated in response to initiation of the incoming data signals accepted by said receiving leg to preclude the said application of signals by the corresponding sending leg; characterized in that said control circuit includes means responsive to the termination of the hub circuit regenerated data signals for restoring said control circuit.

2. In a hub type repeater, in accordance with claim 1, wherein said data signals comprise marking and spacing signal elements, said control circuit is arranged to recognize the initiation of the incoming data signals by detecting a spacing signal element therein, and said restoring means is arranged to recognize the termination of the regenerated signals by detecting a marking signal element therein.

3. In a hub type repeater, in accordance with claim 2, wherein said control circuit has two stable states, said control circuit being arranged to be operated to one stable state in response to each spacing element accepted by the receiving leg and said restoring means being arranged to restore the control circuit to the other stable state in response to each hub circuit regenerated marking element.

4. In a hub type repeater, in accordance with claim 3, wherein said receiving leg applies an operating signal to the control circuit in response to each accepted spacing element and said restoring means applies an opposing restoring signal to the control circuit in response to each regenerated marking element, the control circuit being further arranged to be operated when said operating signal and said restoring signal are concurrently applied thereto.

5. In a hub type repeater, in accordance with claim 1, wherein said common hub circuit is further arranged to generate a predetermined signal in response to the application thereto of data signals by a plurality or receiving legs and said sending leg is further arranged to overcome the blockage applied by the control circuit in response to the acceptance of the predetermined signal.

6. In a hub type repeater for data signals, a common hub circuit, a plurality of receiving legs, each of said receiving legs arranged to accept data signals from an incoming source and to apply the signals to said common hub circuit, a plurality of sending legs, each of said sending legs corresponding to a receiving leg and arranged to accept data signals from the common hub circuit and apply the signals to an outgoing circuit, and a control circuit connected to each receiving leg and operated in response to data signals accepted by said receiving leg to block the said application of signals by the corresponding sending leg; said hub circuit being further arranged to generate a predetermined signal in response to the application thereto of data signals by a plurality of receiving legs; characterized in that said sending leg is further arranged to accept said predetermined signal and, in response thereto, override the blockage provided by the control circuit whereby a signal is applied to the outgoing circuit.

7. In a hub type repeater, in accordance with claim 6 wherein said control circuit includes means for applying blocking bias to the sending leg to block the said application of signals, said blocking bias exceeding in amplitude said data signals from the common hub and said predetermined signal exceeding in amplitude said blocking bias.

8. In a hub type repeater, in accordance with claim 6, wherein said data signals comprise marking and spacing elements, said control circuit is arranged to recognize said acceptance of data signals by the receiving leg by detecting a spacing signal element therein and said hub circuit is further arranged to recognize the application thereto of data signals by a plurality of receiving legs by detecting the simultaneous application of spacing elements, said predetermined signal comprising a double space signal.